(12) United States Patent
Ishii et al.

(10) Patent No.: US 9,601,734 B2
(45) Date of Patent: Mar. 21, 2017

(54) BATTERY (71) Applicant: KABUSHIKI KAISHA TOSHIBA, Minato-ku (JP)

(72) Inventors: Haruchika Ishii, Kashiwazaki (JP); Eiki Kashiwazaki, Kashiwazaki (JP); Souichi Hanafusa, Kashiwazaki (JP); Natsuki Toyota, Takasaki (JP); Tsutomu Matsui, Kashiwazaki (JP); Tatsuya Shinoda, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/199,129

(22) Filed: Mar. 6, 2014

(65) Prior Publication Data
US 2014/0272487 A1 Sep. 18, 2014

(30) Foreign Application Priority Data

Mar. 14, 2013 (JP) .................................. 2013-051595

(51) Int. Cl.
*H01M 2/26* (2006.01)
*H01M 2/12* (2006.01)
(Continued)

(52) U.S. Cl.
CPC .......... *H01M 2/12* (2013.01); *H01M 2/1235* (2013.01); *H01M 2/22* (2013.01); *H01M 2/26* (2013.01);
(Continued)

(58) Field of Classification Search
CPC .......... H01M 2/26; H01M 2/12; H01M 2/235; H01M 2/22; H01M 10/0413;
(Continued)

(56) References Cited

U.S. PATENT DOCUMENTS

| 2010/0081052 A1 | 4/2010 | Morishima et al. |
| 2010/0124694 A1 | 5/2010 | Hikata et al. |

(Continued)

FOREIGN PATENT DOCUMENTS

| CN | 102763238 A | 10/2012 |
| EP | 2 325 924 A1 | 5/2011 |

(Continued)

OTHER PUBLICATIONS

Extended Search Report issued Aug. 7, 2014 in European Patent Application No. 14158047.2.

(Continued)

*Primary Examiner* — Jonathan G Leong
*Assistant Examiner* — Seenam Agbetiafan
(74) *Attorney, Agent, or Firm* — Oblon, McClelland, Maier & Neustadt, L.L.P.

(57) ABSTRACT

In general, according to one embodiment, there is provided a battery. This battery includes a container, a lid, a gas-relief vent, an electrode group, an intermediate lead, and a terminal lead. The gas-relief vent is provided in the lid. The intermediate lead includes a first lead-joint part, an electrode-group-joint part, and a leg part. The leg part connects the first lead-joint part and the electrode-group-joint part to each other. The first lead-joint part and the electrode-group-joint part are located on planes different from each other.

7 Claims, 2 Drawing Sheets (51) Int. Cl.
  *H01M 2/22* (2006.01)
  *H01M 10/04* (2006.01)
  *H01M 10/0525* (2010.01)
  *H01M 10/058* (2010.01)
  H01M 2/04 (2006.01)
  H01M 4/1391 (2010.01)
  H01M 4/36 (2006.01)

(52) U.S. Cl.
  CPC ... *H01M 10/0413* (2013.01); *H01M 10/0431* (2013.01); *H01M 10/058* (2013.01); *H01M 10/0525* (2013.01); *H01M 2/043* (2013.01); *H01M 4/1391* (2013.01); *H01M 4/364* (2013.01); *H01M 2220/20* (2013.01); *Y02E 60/122* (2013.01)

(58) Field of Classification Search
  CPC ......... H01M 10/0431; H01M 10/0525; H01M 10/058; H01M 2/043; H01M 4/1391; H01M 4/364; H01M 2220/20; Y02E 60/122
  See application file for complete search history.

(56) References Cited

U.S. PATENT DOCUMENTS

| | | |
|---|---|---|
| 2010/0266894 A1 | 10/2010 | Byun et al. |
| 2010/0323239 A1 | 12/2010 | Kim |
| 2011/0104528 A1 | 5/2011 | Byun et al. |
| 2011/0244314 A1 | 10/2011 | Lee et al. |
| 2012/0251874 A1 | 10/2012 | Guen |
| 2012/0308855 A1 | 12/2012 | Shimizu et al. |

FOREIGN PATENT DOCUMENTS

| | | |
|---|---|---|
| EP | 2 398 088 A2 | 4/2012 |
| EP | 2 398 088 A3 | 4/2012 |
| EP | 2 506 358 A1 | 10/2012 |
| EP | 2 538 467 A1 | 12/2012 |
| JP | 2000-277154 | 10/2000 |
| JP | 2005-267945 | 9/2005 |
| JP | 2009-087728 | 4/2009 |
| JP | 2009-87753 | 4/2009 |
| JP | 2010-80393 | 4/2010 |
| JP | 2011-49065 | 3/2011 |
| JP | 2011-70917 | 4/2011 |
| JP | 2011-70918 | 4/2011 |
| JP | 2011-81964 | 4/2011 |
| JP | 2011-192547 | 9/2011 |
| JP | 2011-243575 | 12/2011 |
| JP | 2012-174411 | 9/2012 |
| WO | WO 2011/102368 | 8/2011 |

OTHER PUBLICATIONS

U.S. Appl. No. 14/199,256, filed Mar. 6, 2014, Ishii, et al.
Combined Chinese Office Action and Search Report issued Nov. 19, 2015 in Patent Application No. 201410094004.0 (with English language translation).
Office Action issued Jan. 10, 2017, in corresponding Japanese Patent Application No. 2013-051595.

BATTERY

CROSS-REFERENCE TO RELATED APPLICATIONS

This application is based upon and claims the benefit of priority from Japanese Patent Application No. 2013-051595, filed Mar. 14, 2013, the entire contents of which are incorporated herein by reference.

FIELD

Embodiments described herein relate generally to a battery.

BACKGROUND

A nonaqueous electrolyte battery (for example, a lithium-ion battery) having a high energy density has attracted attention as a large-sized and large-capacity power source used in an electric vehicle (EV), a hybrid vehicle (HEV), an electric motorbike, and a forklift or the like. The lithium-ion battery is developed to achieve a bigger size and larger capacity while also considering long life and safety or the like. As a large-capacity power source, a battery pack, which houses many batteries connected in series or in parallel so as to increase the electric driving power, had been developed.

Particularly, for a nonaqueous electrolyte battery, aluminum substrate is often used as a positive electrode current collector since aluminium has oxidation resistance.

In recent years, a battery including lithium titanate as a negative electrode has been developed. Such battery including lithium titanate in the negative electrode has recently utilized an aluminum substrate as the negative electrode current collector.

On the other hand, a plurality of conductive current collecting tabs are often extending from an electrode to achieve high output. Ultrasonic joining is suitable in order to join the plurality of current collecting tabs together, and to join the plurality of current collecting tabs to a lead or the like connected to the outside of a battery container. Regarding the joining by, for example, laser, it is difficult to join a plurality of metal plates together to produce one member. Furthermore, when current collecting tabs containing an aluminum material are subjected to resistance welding, the aluminum material tends to be scattered or flung off at the moment of the joining. This is because an oxide film formed on the surface of an aluminum material has a high melting point although aluminum itself has a low melting point and a low boiling point.

However, when the lead attached to a lid and the current collecting tab are subjected to ultrasonic joining, and the ultrasonic wave generated during welding is transmitted to the lid, a gas-relief vent provided in the lid may be broken or deteriorated. Therefore, if no ingenuity is utilized during the ultrasonic joining, the reliability of the gas-relief vent may be decreased.

For this reason, a means for attenuating the transmission of such ultrasonic wave is performed by making a thin portion in a lead part.

DETAILED DESCRIPTION

In general, according to one embodiment, there is provided a battery. This battery includes a container, a lid, a gas-relief vent, an electrode group, an intermediate lead, and a terminal lead. The container has an opening. The lid is provided on the opening of the container. The gas-relief vent is provided in the lid. The electrode group is housed in the container. The electrode group has an edge face opposed to the lid, and includes a plurality of current collecting tabs extending from the edge face. The intermediate lead includes a first lead-junctional part, an electrode-group-joint part, and a leg part. A plurality of current collecting tabs are electrically connected to the electrode-group-joint part. The leg part connects the first lead-joint part and the electrode-group-joint part to each other. The first lead-joint part and the electrode-group-joint part are located on planes different from each other. The terminal lead includes a lid-joint part and a second lead-joint part. The lid-joint part is connected to the lid. The second lead-joint part extends from the lid-joint part. The second lead-joint part is opposed to the first lead-joint part. The second lead-joint part is electrically connected to the first lead-joint part.

Hereinafter, the embodiment will be described with reference to the drawings. In the following description, structural elements exhibiting the same or similar function throughout all the drawings are designated by the same reference sign and repeated explanations are omitted.

In the intermediate lead included in the battery according to this embodiment, the electrode-group-joint part to be joined to a plurality of current collecting tabs, and the first lead-joint part to be joined to the terminal lead are on planes different from each other. Therefore, the joining between the electrode-group-joint part of the intermediate lead and the plurality of current collecting tabs can be performed independently of the joining between the first lead-joint part of the intermediate lead and the second lead-joint part of the terminal lead. That is, it is unnecessary to connect the terminal lead, the intermediate lead, and the plurality of current collecting tabs in one process.

For example, after the joining between the electrode-group-joint part of the intermediate lead and the plurality of current collecting tabs is performed by ultrasonic joining, the joining between the first lead-joint part of the intermediate lead and the second lead-joint part of the terminal lead can be performed by laser welding or resistance welding.

According to such joining, the terminal lead is unaffected by ultrasonic joining. Therefore, according to such joining, ultrasonic vibration is not transmitted to the gas-relief vent provided in the lid. That is, such joining can prevent damage to and deterioration of the gas-relief vent. Therefore, the battery according to the embodiment can be provided with a reliable gas-relief vent.

Since ultrasonic vibration is not transmitted to the gas-relief vent included in the lid, such joining can provide a gas-relief vent of higher reliability than that of a gas-relief vent provided with a thin portion in a lead part to attenuate the transmission of an ultrasonic wave, without increasing electric resistance.

Furthermore, according to such joining, the plurality of current collecting tabs are not subjected to laser welding, which is unsuitable for use for joining a plurality of metal plates, or resistance welding, which involves the possibility that the aluminum material of the current collecting tab will scatter or be flung off. Therefore, such joining of the plurality of current collecting tabs can be easily and firmly performed.

In the intermediate lead included in the battery according to this embodiment, the leg part is provided between the electrode-group-joint part and the first lead-joint part. Even if the electrode-group-joint part in the intermediate lead having such a structure is subjected to ultrasonic joining, which causes a stress in the intermediate lead, the stress can be reduced by the deformation of the electrode-group-joint part and optionally the deformation of the leg part. This can prevent the transmission of the stress to the first lead-joint part. That is, such an intermediate lead can suppress the deformation of the first lead-joint part caused by the ultrasonic wave even when the electrode-group-joint part is subjected to ultrasonic joining. Since the first lead-joint part of the intermediate lead can suppress the deformation by ultrasonic joining as described above, the first lead-joint part can have comparatively high flatness. As the flatness of a material to be welded is higher, laser welding and resistance welding can be easily and firmly performed. Therefore, even if the electrode-group-joint part has been subjected to ultrasonic joining, the joining between the first lead-joint part of the intermediate lead and the second lead-joint part of the terminal lead can be easily and firmly performed by laser welding or resistance welding. The connected part thus obtained can have a high joining strength. The firm joining can suppress the resistance value of the connected part. That is, the connected part between the first lead-joint part of the intermediate lead and the second lead-joint part of the terminal lead can exhibit a low resistance value.

Thus, this embodiment can provide the battery which can include a reliable gas-relief vent and exhibit a low resistance value.

The electrode-group-joint part of the intermediate lead and the plurality of current collecting tabs are preferably joined by ultrasonic joining. A plurality of metals can be simultaneously and firmly joined by ultrasonic joining. Therefore, the connected part between the electrode-group-joint part of the intermediate lead and the plurality of current collecting tabs by ultrasonic joining can exhibit a low resistance value.

The first lead-joint part of the intermediate lead and the second lead-joint part of the terminal lead is preferably joined by laser welding or resistance welding.

A portion of electrode-group-joint part of the intermediate lead is preferably subjected to ultrasonic joining and the portion has a width corresponding to the 5% to 95% of a width W of the electrode-group-joint part. The width W of the electrode-group-joint part of the intermediate lead is a width of the electrode-group-joint part in a direction parallel to a direction of the width of the plurality of current collecting tabs ultrasonically-joined to the electrode-group-joint part, as shown, for example, in FIG. 2. The width of the plurality of current collecting tabs is the width of the current collecting tabs in a direction perpendicular to a direction in which the current collecting tabs extend from the electrode group, for example. When the electrode-group-joint part has the width of the ultrasonically-joined portion within the range, the deformation of the first lead-joint part due to the ultrasonic joining can be further suppressed. Due to this, the joining between the first lead-joint part of the intermediate lead and the second lead-joint part of the terminal lead can be more firmly performed. As a result, a lower resistance value can be exhibited. The battery including the intermediate lead described above can decrease a volume occupied by the intermediate lead as a non-electric generation element in the battery. As a result, the battery can have a higher volume energy density. The intermediate lead preferably has a belt-like area, which is not ultrasonically joined, having a width of 1 mm to 100 mm.

The length of the ultrasonically-joined portion of the electrode-group-joint part can be obtained by, for example, SEM-observing the section of the connected part between the intermediate lead and the current collecting tab along the direction of the width W of the electrode-group-joint part of the intermediate lead.

The width W of the electrode-group-joint part of the intermediate lead, and a distance l between a principal surface of the electrode-group-joint part of the intermediate lead opposed to the terminal lead and a principal surface of the second lead-joint part of the terminal lead opposed to the intermediate lead preferably satisfy the relation: $0.005 \leq l/W \leq 5$. A battery satisfying this relation can further decrease the stress generated in the intermediate lead due to the ultrasonic wave. As a result, the deformation of the first lead-joint part can be further prevented. Furthermore, such a battery can further suppress the volume occupied by the intermediate lead as the non-electric generation element in the battery. As a result, the volume energy density can be further increased. The width W and the distance l more preferably satisfy the relation: $0.005 \leq l/W \leq 2.5$. The distance l is more preferably within a range of 0.1 mm to 50 mm.

Furthermore, a ratio of a length f of the first lead-joint part in the direction of the width W of the electrode-group-joint part of the intermediate lead with respect to the width W of the electrode-group-joint part is preferably within a range of 0.05 to 0.5. Such an intermediate lead can have a sufficient large ratio of the size of the first lead-joint part with respect to the overall size of the intermediate lead, and the joining between the first lead-joint part and the second lead-joint part of the terminal lead can be easily performed in a stable state. Furthermore, such an intermediate lead can further suppress the volume occupied by the intermediate lead as the non-electric generation element in the battery. As a result, the volume energy density can be further increased.

Each of the dimensions of the principal surface of the first lead-joint part of the intermediate lead is preferably within a range of 0.1 mm to 10 mm. Since the first lead-joint part having each dimension which is within the range has a sufficiently larger wide than a laser diameter usually used in laser welding, the laser welding can be more easily and firmly performed. Furthermore, such an intermediate lead can further suppress the volume occupied by the intermediate lead as the non-electric generation element in the battery. As a result, the volume energy density can be further increased.

The terminal lead preferably contains a metal which can be subjected to laser welding or resistance welding. Particularly, the terminal lead preferably contains an aluminum material or an aluminum alloy material. Since aluminum has a comparatively low melting point, the terminal lead containing an aluminum material or an aluminum alloy material can be easily subjected to laser welding.

The intermediate lead preferably contains a metal which can be subjected to laser welding or resistance welding and can be subjected to ultrasonic joining. Particularly, the intermediate lead preferably contains an aluminum material or an aluminum alloy material. As described above, since aluminium has a comparatively low melting point, the intermediate lead containing an aluminum material or an aluminum alloy material can be easily subjected to laser welding or resistance welding.

Furthermore, the plurality of current collecting tabs preferably contain an aluminum material or an aluminum alloy material. Such current collecting tabs can have excellent corrosion resistance.

Both the intermediate lead and the plurality of current collecting tabs more preferably contain an aluminum material or an aluminum alloy material. The metal member thus containing the homogeneous metal can attain firmer joining when utilizing ultrasonic joining.

As the aluminum material, for example, 1000-series aluminum materials such as a 1080 aluminum material, a 1070 aluminum material, a 1050 aluminum material, a 1100 aluminum material, a 1N30 aluminum material, and a 1N90 aluminum material can be used. As the aluminum alloy material, for example, 2000-series aluminum alloy materials such as a 2014P aluminum alloy material and a 2017P aluminum alloy material, and 3000-series aluminum alloy materials such as a 3003P aluminum alloy material and a 3203P aluminum alloy material can be used.

Hereinafter, an example of a battery according to this embodiment will be described with reference to the drawings.

Figure 1:
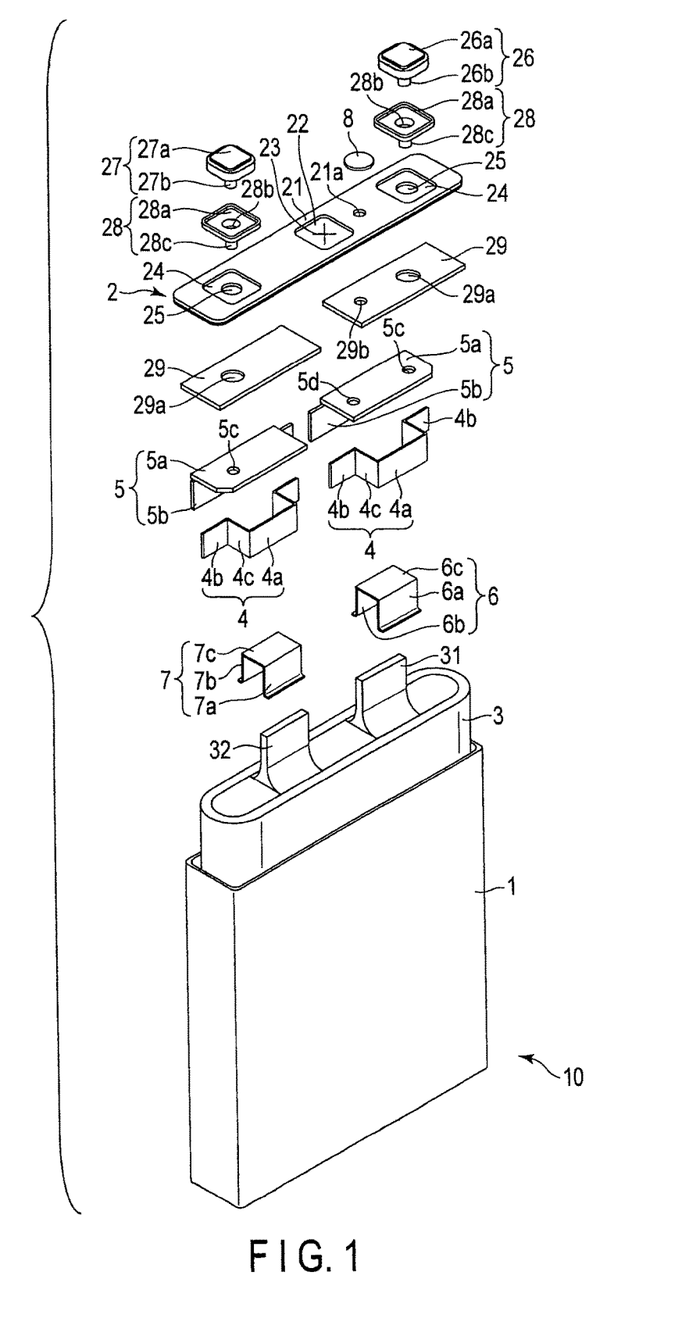
FIG. 1 is an exploded perspective view of main parts of a battery of an example according to an embodiment.
Figure 2:
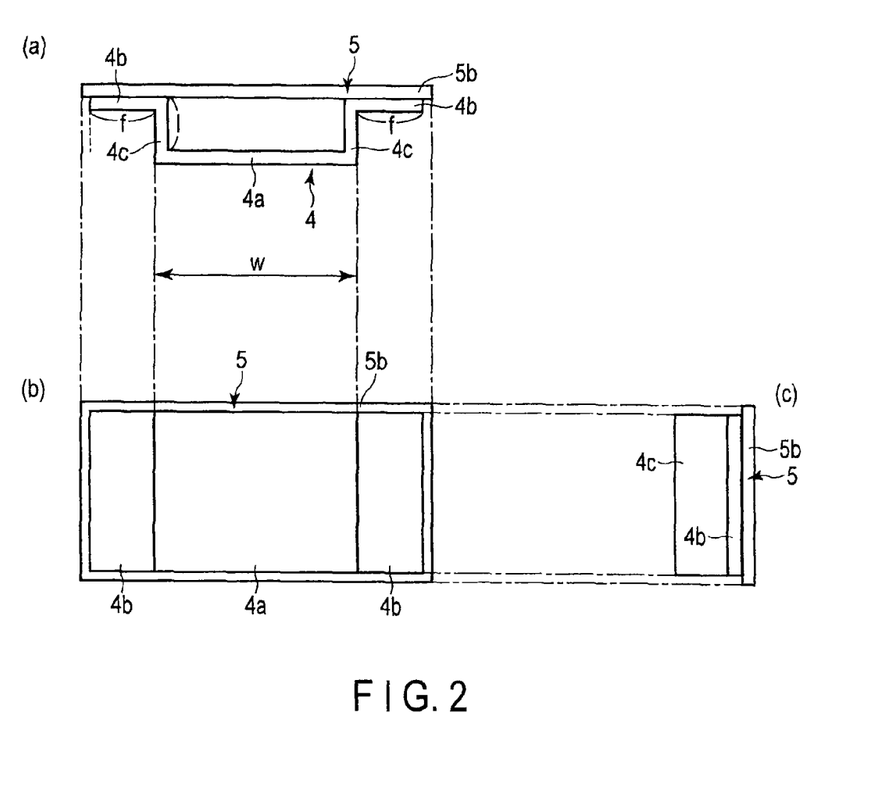
FIG. 2 is a schematic three-view drawing of an intermediate lead connected to a terminal lead included in the battery of FIG. 1; (a) is a plan view; (b) is a front view; and (c) is a side view.

FIG. 1 is an exploded perspective view of main parts of a battery of an example according to this embodiment. FIG. 2 is a schematic three-view diagram of an intermediate lead connected to a terminal lead included in the battery of FIG. 1. In FIG. 2, (a) is a plan view; (b) is a front view; and (c) is a side view.

A battery 10 shown in FIG. 1 includes a container 1, a lid 2, an electrode group 3, two intermediate leads 4, and two terminal leads 5.

The container 1 is made of a metal. The container 1 has an opening and a bottom, and has a square tube shape. The lid 2 is provided on the opening of the container 1. The opening is blocked off by the lid 2. The container 1 houses the electrode group 3 and an electrolytic solution (not shown).

The lid 2 includes a sealing plate 21. The sealing plate 21 is made of the same kind of metal as that of the container 1. The peripheral part of the sealing plate 21 is welded to the container 1.

A gas-relief vent 22 is provided in the sealing plate 21. The gas-relief vent 22 includes a cross-shaped groove 23 formed in the bottom face of a rectangular recessed part formed in the sealing plate 21. In the sealing plate 21, a portion in which the groove 23 is formed is particularly thin. Therefore, when the internal pressure of the container 1 increases, the groove 23 is ruptured, and thereby a gas in the container 1 can be emitted to the outside.

In addition to the gas-relief vent 22, two recessed parts 24 are formed in the sealing plate 21. Through holes 25 are respectively formed in the bottom parts of the recessed parts 24.

Furthermore, a liquid injection port 21a is formed in the sealing plate 21.

A positive electrode terminal 26, a negative electrode terminal 27, two external insulating materials 28, and two internal insulating materials 29 are fixed to the sealing plate 21.

The positive electrode terminal 26 has a rivet shape including a conductive flange part 26a and a shaft part 26b. The negative electrode terminal 27 has a rivet shape including a conductive flange part 27a and an shaft part 27b.

The external insulating material 28 has a rivet shape including a flange part 28a having a through hole 28b, and an shaft part 28c. The shaft part 28c of the external insulating material 28 has a hollow structure where the through hole 28b beginning at the flange part 28a extends.

The flange parts 28a of the external insulating materials 28 are respectively fitted into the two recessed parts 24 of the sealing plate 21. The shaft parts 28c of the external insulating materials 28 are inserted into the through holes 25 respectively provided in the bottom parts of the two recessed parts 24. The shaft part 26b of the positive electrode terminal 26 is inserted into the through hole 28b of one of the external insulating materials 28. Similarly, the shaft part 27b of the negative electrode terminal 27 is inserted into the through hole 28b of the other external insulating material 28. By such arrangement, one of the two external insulating materials 28 is located between the positive electrode terminal 26 and the sealing plate 21 and the other is located between the negative electrode terminal 27 and the sealing plate 21. Therefore, the positive electrode terminal 26 and the negative electrode terminal 27 are electrically insulated from the sealing plate 21 by the external insulating materials 28.

The internal insulating materials 29 and the external insulating materials 28 are attached to the sealing plate 21 so that the sealing plate 21 is sandwiched between one of the external insulating materials 28 and one of the internal insulating materials 29. The internal insulating material 29 has a rectangular shape, and has a through hole 29a formed on a surface thereof. The shaft part 26b of the positive electrode terminal 26 passing through the through hole 28b of the external insulating material 28 is inserted into the through hole 29a of one of the internal insulating materials 29. Similarly, the shaft part 27b of the negative electrode terminal 27 passing through the through hole 28b of the external insulating material 28 is inserted into the through hole 29a of the other internal insulating material 29. The internal insulating material 29 through which the shaft part 26b of the positive electrode terminal 26 passes further has a through hole 29b.

The electrode group 3 contains a plurality of positive electrodes which are not shown, a plurality of negative electrodes which are not shown, and a separator which is not shown. The positive electrode and the negative electrode are laminated with the separator sandwiched therebetween. The electrode group 3 is impregnated with an electrolytic solution which is not shown.

The positive electrode includes a belt-like positive electrode current collector and a positive electrode active material-containing layer formed on a part of the surface of the current collector. The positive electrode current collector includes a strip-like positive electrode current collecting tab 31 having a surface on which a positive electrode active material layer is not formed. A plurality of positive electrode current collecting tabs 31 extend from an edge face of the electrode group 3 opposed to the lid 2. In FIG. 1, the plurality of positive electrode current collecting tabs 31 are collectively referred to as a member 31 which is an assembly.

The negative electrode includes a belt-like negative electrode current collector, and a negative electrode active material-containing layer formed on a part of the surface of the current collector. The negative electrode current collector includes a strip-like negative electrode current collecting tab 32 having a surface on which a negative active material layer is not formed. The plurality of negative electrode current collecting tabs 32 extend from an edge face of the electrode group 3 opposed to the lid 2. In FIG. 1, the plurality of negative electrode current collecting tabs 32 are collectively referred to as a member 32 which is an assembly.

The battery 10 shown in FIG. 1 further includes a positive electrode backup lead 6 and a negative electrode backup lead 7.

The positive electrode backup lead 6 includes a first sandwiching part 6a having a rectangular shape, a second sandwiching part 6b having a rectangular shape, and a connection part 6c having a rectangular shape. The connection part 6c has a principal surface having a rectangular shape. The first sandwiching part 6a and the second sandwiching part 6b extend from two end parts along the long side of the principal surface of the connection part 6c in the same direction in a direction perpendicular to the principal surface.

Similarly, the negative electrode backup lead 7 includes a first sandwiching part 7a having a rectangular shape, a second sandwiching part 7b having a rectangular shape, and a connection part 7c having a rectangular shape. The connection part 7c has a principal surface having a rectangle shape. The first sandwiching part 7a and the second sandwiching part 7b extend from two end parts along the long side of the principal surface of the connection part 7c in the same direction in a direction perpendicular to the principal surface.

The plurality of positive electrode current collecting tabs 31 are sandwiched between the first sandwiching part 6a and the second sandwiching part 6b of the positive electrode backup lead 6. Similarly, the plurality of negative electrode current collecting tabs 32 are sandwiched between the first sandwiching part 7a and the second sandwiching part 7b of the negative electrode backup lead 7.

A intermediate lead 4 includes an electrode-group-joint part 4a having a rectangular shape, two first lead-joint parts 4b having a rectangular shape, and two leg parts 4c having a rectangular shape, as shown in FIG. 2.

One of the leg parts 4c connects the electrode-group-joint part 4a and one of the first lead-joint parts 4b to each other so that these are located on planes different from each other. The other leg part 4c connects the electrode-group-joint part 4a and the other first lead-joint part 4b to each other so that these are located on planes different from each other. The principal surfaces of the two leg parts 4c are opposed to each other. The principal surfaces of the first lead-joint parts 4b are not opposed to the principal surface of the electrode-group-joint part 4a.

The electrode-group-joint part 4a of one of the intermediate leads 4 is ultrasonically joined to the positive electrode current collecting tab 31 and the positive electrode backup lead 6 sandwiching the tab 31. The electrode-group-joint part 4a of the other intermediate lead 4 is ultrasonically joined to the negative electrode current collecting tab 32 and the negative electrode backup lead 7 sandwiching the tab 32.

Each of a terminal leads 5 includes a lid-joint part 5a having a rectangular shape and a second lead-joint part 5b having a rectangular shape. The lid-joint part 5a has a principal surface having a rectangular shape. The second lead-joint part 5b extends from an end part along one long side of the principal surface of the lid-joint part 5a in a direction perpendicular to the principal surface of the lid-joint part 5a.

The lid-joint part 5a of each of the terminal leads 5 has a through hole 5c. The shaft part 26b of the positive electrode terminal 26 passing through the through hole 29a of the internal insulating material 29 is inserted into the through hole 5c of the lid-joint part 5a of one of the terminal leads 5. The shaft part 27b of the negative electrode terminal 27 passing through the through hole 29a of the internal insulating material 29 is inserted into the through hole 5c of the lid-joint part 5a of the other terminal lead 5.

The lid-joint part 5a of the terminal lead 5 through which the shaft part 26b of the positive electrode terminal 26 passes further has a through hole 5d.

The shaft part 26b of the positive electrode terminal 26 passes through the through hole 28b of one of the external insulating materials 28, the through hole 25 of one of the recessed parts 24 of the sealing plate 21, the through hole 29a of one of the internal insulating materials 29, and the through hole 5c of the lid-joint part 5a of one of the terminal leads 5 in order. The tip of the shaft part 26b of the positive electrode terminal 26 passing through the through hole 5c of the lid-joint part 5a of the terminal lead 5 is caulked.

Similarly, the shaft part 27b of the negative electrode terminal 27 passes through the through hole 28b of the other external insulating material 28, the through hole 25 of the other recessed part 24 of the sealing plate 21, the through hole 29a of the other internal insulating material 29, and the through hole 5c of the lid-joint part 5a of the other terminal lead 5 in order. The tip of the shaft part 27b of the negative electrode terminal 27 passing through the through hole 5c of the lid-joint part 5a of the terminal lead 5 is caulked.

Thus, the two terminal leads 5, the positive electrode terminals 26, the negative electrode terminal 27, the two external insulating materials 28, and the two internal insulating materials 29 are caulked and fixed to the sealing plate 21.

As described above, the positive electrode terminal 26 and the negative electrode terminal 27 are electrically insulated from the sealing plate 21. The area of a surface of the two internal insulating materials 29 opposed to the lid-joint parts 5a of the two terminal leads 5 is larger than the area of the lid-joint parts 5a. Therefore, the two terminal leads 5 are also insulated from the sealing plate 21.

On the other hand, since the shaft part 26b of the positive electrode terminal 26 has conductivity, the positive electrode terminal 26 is electrically connected to the terminal lead 5 which is caulked and fixed to the sealing plate 21. Similarly, since the shaft part 27b of the negative electrode terminal 27 has conductivity, the negative electrode terminal 27 is electrically connected to the terminal lead 5 which is caulked and fixed to the sealing plate 21.

In the battery 10 shown in FIG. 1, the position of the liquid injection port 21a formed in the sealing plate 21 corresponds to the position of the through hole 29b of the internal insulating material 29 through which the shaft part 26b of the positive electrode terminal 26 passes, and the position of the through hole 5d of the terminal lead 5 electrically connected to the positive electrode terminal 26. Thus, the liquid injection port 21a, the through hole 29b, and the through hole 5d having the positions corresponding to each other constitute a liquid injection passage for injecting the electrolytic solution into the battery 10 from the exterior. The liquid injection port 21a is blocked by a metal sealing lid 8. The periphery of the sealing lid 8 is welded to the sealing plate 21.

In the second lead-joint part 5b of the terminal lead 5 electrically connected to the positive electrode terminal 26 in the battery 10 shown in FIG. 1, portions respectively opposed to the two first lead-joint parts 4b of the intermediate lead 4 ultrasonically-joined to the positive electrode current collecting tab 31 are respectively laser-welded to the two first lead-joint parts 4b of the intermediate lead 4. Also, in the second lead-joint part 5b of the terminal lead 5 electrically connected to the negative electrode terminal 27, portions respectively opposed to the two first lead-joint parts 4b of the intermediate lead 4 ultrasonically-joined to the negative electrode current collecting tab 32 are respectively laser-welded to the two first lead-joint parts 4b of the intermediate lead 4.

Now, as described above, each of the intermediate lead 4 include the two leg parts 4c, and thereby the principal surface of the electrode-group-joint part 4a is on a plane different from a plane on which the principal surfaces of the two first lead-joint parts 4b exist. Therefore, the battery 10 shown in FIG. 1 including the intermediate lead 4 shown in detail in FIG. 2 can be produced by performing the joining between the electrode-group-joint part 4a of the intermediate lead 4 and the plurality of current collecting tabs 31 or 32 independently of the joining between the first lead-joint parts 4b of the intermediate lead 4 and the second lead-joint part 5b of the terminal lead 5.

That is, after the joining between the electrode-group-joint part 4a of one of the intermediate leads 4 and the plurality of positive electrode current collecting tabs 31 and the joining between the electrode-group-joint part 4a of the other intermediate lead 4 and the plurality of negative electrode current collecting tabs 32 are performed by ultrasonic joining, the joining between the first lead-joint parts 4b of the intermediate lead 4 and the second lead-joint part 5b of the terminal lead 5 can be performed by laser welding.

Since the terminal lead 5 is unaffected by ultrasonic joining according to such joining, ultrasonic vibration is not transmitted to the gas-relief vent 22 physically-integrated with the terminal lead 5. Therefore, the gas-relief vent 22 of the battery 10 can have high reliability.

According to such joining, the plurality of positive electrode current collecting tabs 31 and the plurality of negative electrode current collecting tabs 32 are not subjected to laser welding, which is unsuitable for use for joining a plurality of metal plates, nor resistance welding, in which the aluminum material of the current collecting tab may be scattered and flung off. Therefore, each of the plurality of positive electrode current collecting tabs 31, the plurality of negative electrode current collecting tabs 32 and the electrode-group-joint part 4a of the intermediate lead 4 can be easily and firmly joined together by ultrasonic joining suitable for joining the plurality of metal plates.

Furthermore, in the intermediate lead 4, the leg part 4c is provided between the electrode-group-joint part 4a and each of the first lead-joint parts 4b. In the intermediate lead 4 having such a structure, even if the electrode-group-joint part 4a is subjected to ultrasonic joining, which generates a stress in the intermediate lead 4, the stress can be reduced by the deformation of the electrode-group-joint part 4a and the possible deformation of the leg parts 4c, and the transmission of the stress to the first lead-joint parts 4b can be prevented. That is, in the intermediate lead 4, even if the electrode-group-joint part 4a is subjected to ultrasonic joining, the deformation of the first lead-joint part 4b due to the ultrasonic wave can be suppressed. The joining between the first lead-joint part 4b of the intermediate lead 4 which can be flat since the deformation can be suppressed and the second lead-joint part 5b of the terminal lead 5 can be easily and firmly performed by laser welding or resistance welding. Therefore, the connected part between the first lead-joint part 4b of the intermediate lead 4 and the second lead-joint part 5b of the terminal lead 5 can have a high joining strength. That is, the connected part between the first lead-joint part 4b of the intermediate lead 4 and the second lead-joint part 5b of the terminal lead 5 can exhibit a low resistance value.

The joining between the first lead-joint part 4b of the intermediate lead 4 and the second lead-joint part 5b of the terminal lead 5 is firmly performed by laser welding. The electrode-group-joint part 4a of the intermediate lead 4 is firmly joined to the plurality of current collecting tabs 31 or 32 by ultrasonic joining. Thus, the battery 10 having the firmly joined members can have a low resistance value.

Thus, the battery 10 shown in FIG. 1 can include a reliable gas-relief vent, and can exhibit a low resistance value.

The battery according to this embodiment described above is not limited to any of a primary battery and a secondary battery. Examples of the battery according to this embodiment include a lithium-ion secondary battery.

Hereinafter, the positive electrode, the negative electrode, the separator, the electrolytic solution, and the container which can be used in the battery according to this embodiment, and the structure and shape of the electrode group will be described in detail.

1) Positive Electrode

The positive electrode can include a positive electrode current collector and a positive electrode active material-containing layer formed on a part of the surface of the current collector.

The positive electrode active material-containing layer can include a positive electrode active material and, optionally, a conductive agent and a binder.

As the positive electrode active material, for example, oxides or sulfides can be used. Examples of the oxides and sulfides include manganese dioxide ($MnO_2$), iron oxide, copper oxide, nickel oxide, into each of which lithium can be absorbed, lithium-manganese composite oxide (e.g., $Li_xMn_2O_4$ or $Li_xMnO_2$), lithium-nickel composite oxide (e.g., $Li_xNiO_2$), lithium-cobalt composite oxide (e.g., $Li_xCoO_2$), lithium-nickel-cobalt composite oxide (e.g., $LiNi_{1-y}Co_yO_2$), lithium-manganese-cobalt composite oxide (e.g., $Li_xMn_yCo_{1-y}O_2$), lithium-manganese-nickel composite oxide having a spinel structure (e.g., $Li_xMn_{2-y}Ni_yO_4$), lithium-phosphorous oxide having an olivine structure (e.g., $Li_xFePO_4$, $Li_xFe_{1-y}Mn_yPO_4$, and $Li_xC_oPO_4$), iron sulfate ($Fe_2(SO_4)_3$), vanadium oxide (e.g., $V_2O_5$), and lithium-nickel-cobalt-manganese composite oxides. In the above formula, $0<x\leq1$ and $0<y\leq1$ are set. As the active material, these compounds may be used either alone or in combinations of two or more.

The binder is blended to bind the active material to the current collector. Examples of the binder include polytetrafluoroethylene (PTFE), polyvinylidene fluoride (PVdF), and fluorine-based rubber.

The conductive agent is blended according to the need to improve the current-collecting ability in the positive electrode and to reduce the contact resistance between the active material and the current collector. Examples of the conductive agent include carbonaceous materials such as acetylene black, carbon black, and graphite.

In the positive electrode active material-containing layer, the contents of the positive electrode active material and binder are preferably in the range from 80% by mass to 98% by mass and from 2% by mass to 20% by mass, respectively.

When the content of the binder is 2% by mass or more, sufficient electrode strength can be obtained. When the content of the binder is 20% by mass or less, the amount of an insulating material blended in the electrode can be reduced, which makes it possible to reduce internal resistance.

When the conductive agent is added, the contents of the positive electrode active material, binder and conductive agent are preferably in the range from 77% by mass to 95% by mass, from 2% by mass to 20% by mass, and from 3% by mass to 15% by mass, respectively. When the amount of the conductive agent is 3% by mass or more, the aforementioned effect can be exhibited. When the amount of the conductive agent is 15% by mass or less, the decomposition of the nonaqueous electrolyte on the surface of the conductive agent in the positive electrode when the battery is stored under high temperatures can be reduced.

The positive electrode current collector is preferably an aluminum foil or an aluminum alloy foil containing at least one element selected from Mg, Ti, Zn, Ni, Cr, Mn, Fe, Cu, and Si.

The positive electrode current collector is preferably single-membered with a positive electrode current collecting tab. However, the positive electrode current collector may be separated from the positive electrode current collecting tab.

The positive electrode is produced, for example, by suspending the positive electrode active material, the binder, and the conductive agent blended if necessary, in an appropriate solvent to prepare a slurry, applying this slurry to the surface of a positive electrode current collector, and drying the slurry to form a positive electrode active material-containing layer, followed by pressing. Alternatively, the positive electrode may be produced by mixing the active material and the binder, and the conductive agent, which is blended if necessary, forming the mixture into a pellet, and placing this pellet, as the positive electrode layer, on the current collector.

2) Negative Electrode

The negative electrode can include a negative electrode current collector and a negative electrode active material-containing layer formed on a part of the surface of the negative electrode current collector.

The negative electrode active material-containing layer can include a negative electrode active material and, optionally, a conductive agent and a binder.

As the negative electrode active material, metal oxides, metal nitrides, alloys, and carbon or the like capable of absorbing and releasing lithium ions can be used. As the negative electrode active material, a substance capable of absorbing and releasing lithium ions at a potential of 0.4 V or more (pair Li/Li$^+$) is preferably used.

The conductive agent is blended according to the need to improve the current-collecting ability of the active material and to reduce the contact resistance between the negative electrode active material and the current collector. Examples of the conductive agent include carbonaceous materials such as acetylene black, carbon black, and graphite.

The binder is blended to fill gaps of the dispersed negative electrode active materials and also to bind the negative electrode active material to the current collector. Examples of the binder include polytetrafluoroethylene (PTFE), polyvinylidene fluoride (PVdF), fluorine-based rubber, and styrene-butadiene rubber.

In the negative electrode active material-containing layer, the contents of the active material, conductive agent, and binder are preferably in the range from 68% by mass to 96% by mass, from 2% by mass to 30% by mass, and from 2% by mass to 30% by mass, respectively. When the amount of the conductive agent is 2% by mass or more, the current-collecting performance of the negative electrode layer can be improved. When the amount of the binder is 2% by mass or more, the binding properties between the negative electrode active material-containing layer and the current collector is satisfactory and excellent cycle performance can be expected. On the other hand, in order to improve capacity, the contents of the conductive agent and the binder are preferably 28% by mass or less, respectively.

As the current collector, a material is used which is electrochemically stable at the potential at which absorption/release of lithium occurs in the negative electrode active material. The current collector is preferably made of copper, nickel, stainless steel or aluminum, or an aluminum alloy containing at least one element selected from Mg, Ti, Zn, Mn, Fe, Cu, and Si. The thickness of the current collector is preferably 5 μm to 20 μm. When the thickness is in this range, the weight of the current collector can be reduced, while maintaining the strength of the negative electrode.

The negative electrode current collector is preferably single-membered with a negative electrode current collecting tab. The negative electrode current collector may be separated from the negative electrode current collecting tab.

The negative electrode is produced, for example, by suspending the negative electrode active material, the binder and the conductive agent in a solvent to be widely used, to prepare a slurry, applying this slurry to the surface of the current collector, and drying the slurry to form a negative electrode layer, followed by pressing. The negative electrode may be produced by mixing the negative electrode active material, the binder, and the conductive agent, forming the mixture into a pellet, and placing this pellet, as the negative electrode layer, on the current collector.

3) Separator

The separator may be formed from a porous film containing polyethylene, polypropylene, cellulose, or polyvinylidene fluoride (PVdF), or a synthetic resin nonwoven fabric. Among these, the porous film made of polyethylene or polypropylene melts at a certain temperature and can block electric current. Thereby, safety can be improved.

4) Electrolytic Solution

As the electrolytic solution, a nonaqueous electrolyte may be used, for example.

The nonaqueous electrolyte may be, for example, a liquid nonaqueous electrolyte prepared by dissolving an electrolyte in an organic solvent, or a gel-like nonaqueous electrolyte prepared by forming a composite of a liquid electrolyte and a polymer material.

The liquid nonaqueous electrolyte is preferably dissolved in an organic solvent in a concentration of 0.5 mol/L to 2.5 mol/L.

Examples of the electrolyte dissolved in the organic solvent include lithium salts such as lithium perchlorate (LiClO$_4$), lithium hexafluorophosphate (LiPF$_6$), lithium tetrafluoroborate (LiBF$_4$), hexafluoro arsenic lithium (LiAsF$_6$), lithium trifluoromethasulfonate (LiCF$_3$SO$_3$), and bistrifluoromethylsulfonylimide lithium [LiN(CF$_3$SO$_2$)$_2$], and mixtures of these compounds. The electrolyte is preferably one which is scarcely oxidized even at a high potential, and LiPF$_6$ is most preferable.

Examples of the organic solvent include cyclic carbonates such as propylene carbonate (PC), ethylene carbonate (EC) and vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN), and sulfolan (SL). These organic solvents may be used either alone or in combinations of two or more.

Examples of the polymer material include polyvinylidene fluoride (PVdF), polyacrylonitrile (PAN), and polyethylene oxide (PEO).

An ambient temperature molten salt (ionic melt) containing lithium ions, a polymer solid electrolyte, and an inorganic solid electrolyte or the like may also be used as the nonaqueous electrolyte.

The ambient temperature molten salt (ionic melt) means compounds which may exist in a liquid state at normal temperature (15 to 25° C.) among organic salts constituted of combinations of organic cations and anions. The ambient temperature molten salts include those which singly exist in a liquid state, those which are put into a liquid state when mixed with an electrolyte, and those which are put into a liquid state when dissolved in an organic solvent. Generally, the melting point of the ambient temperature molten salt used in a nonaqueous electrolyte battery is 25° C. or less. The organic cation generally has a quaternary ammonium skeleton.

Alternatively, when the lithium ions are not involved in the battery reaction of the battery according to this embodiment, the electrolytic solution may be an aqueous solution.

5) Container

As the container, a metal container such as the container 1 included in the battery 10 described with reference to FIGS. 1 and 2 can be used.

For example, as the metal container, those having a thickness of 1 mm or less can be used. The metal container preferably has a thickness of 0.5 mm or less. The thickness of the metal container is more preferably 0.2 mm or less.

Examples of the shape of the container include a flat type (thin type), an angular type, a cylinder type, a coin type, and a button type. The container having a size corresponding to the dimensions of a battery may be used. For example, containers for small-sized batteries to be mounted on portable electronic devices, and containers for large-sized batteries to be mounted on two to four-wheel vehicles or the like may be used.

The metal container is made of aluminum, or an aluminum alloy or the like. The aluminum alloy is preferably an alloy containing elements such as magnesium, zinc, and silicon. When the alloy contains transition metals such as iron, copper, nickel, and chromium, the content of the transition metals is preferably 1% by mass or less.

The container is not limited to the metal container. For example, a laminate film container can also be used.

6) Structure and Shape of Electrode Group

As long as the electrode group has a structure where the positive electrode active material and the negative electrode active material are opposed to each other with the separator sandwiched therebetween, any structure can be utilized for the electrode group.

For example, the electrode group can have a stack structure. The stack structure has a structure where the positive electrode and negative electrode described above and the separator are laminated with the separator sandwiched between the positive electrode and the negative electrode.

Alternatively, the electrode group can have a coiled structure. The coiled structure is a structure where the positive electrode and negative electrode described above and the separator are laminated with the separator sandwiched between the positive electrode and the negative electrode, and the laminate thus obtained is spirally wound.

The overall shape of the electrode group can be determined according to the container housing the electrode group.

According to this embodiment described above, the leg part of the intermediate lead of the battery connects the first lead-joint part and the electrode-group-joint part to each other, and the first lead-joint part and the electrode-group-joint part are located on planes different from each other. Therefore, the joining between the first lead-joint part of the intermediate lead and the second lead-joint part of the terminal lead can be firmly performed independently of the joining between the electrode-group-joint part of the intermediate lead and the plurality of current collecting tabs. Because of this, the battery according to this embodiment can include a reliable gas-relief vent, and can exhibit a low resistance value.

EXAMPLES

The present invention will be described in more detail with reference to the examples below. However, the present invention is not limited to these examples, as long as they do not depart from the spirit of the present invention.

Example 1

In Example 1, a battery 10 same as the battery 10 shown in FIGS. 1 and 2 was produced in the following procedure.

1. Production of Electrode Group 3

An electrode group 3 was produced in the following procedure.

<Production of Positive Electrode>

As a positive electrode active material, a positive-electrode-active-material mixture was provided, which was obtained by mixing $LiNi_{0.33}Co_{0.33}Mn_{0.33}O_2$ and $LiCoO_2$ at 7:3. This positive-electrode-active-material mixture, carbon black, and polyvinylidene fluoride (PVdF) were mixed at a mass ratio of 100:5:5, and these were added to N-methylpyrrolidone to produce a slurry. The slurry thus obtained was applied to both surfaces of an aluminum foil as a current collector while a slurry-non-applied part left. The coating amount of the positive electrode was set to 100 $g/m^2$.

The current collector onto which the slurry was applied was dried, followed by pressing. And then, the slurry-non-applied part was punched out so as to produce a positive electrode including a belt-like main part having both surface on each of which a positive electrode active material-containing layer was supported and a strip-like positive electrode current collecting tab 31 on each of which the positive electrode active material-containing layer was not supported.

<Production of Negative Electrode>

As a negative electrode active material, spinel type lithium titanate $Li_4Ti_5O_{12}$ was used. This spinel type lithium titanate, graphite, and PVdF were mixed at a mass ratio of 100:5:5, and these were added to N-methylpyrrolidone to produce a slurry. The slurry thus obtained was applied to both surfaces of an aluminum foil as a current collector while a slurry-non-applied part left. The coating amount of the negative electrode was set to 100 $g/m^2$.

The current collector onto which the slurry was applied was dried, followed by pressing. The slurry-non-applied part was punched out so as to produce a negative electrode including a belt-like main part having both surfaces on each of which a negative electrode active material-containing layer was supported, and a strip-like negative electrode current collecting tab 32 on which the negative electrode active material-containing layer was not supported.

<Separator>

A polyethylene separator having a thickness of 30 μm was used for the separator.

<Production of Electrode Group 3>

The 40 positive electrodes and 40 negative electrodes produced as described above were laminated in order so that the positive electrode active material-containing layer and the negative electrode active material-containing layer were opposed to each other with the separators each of which is sandwiched between each of the positive electrodes and each of the negative electrodes. This lamination was performed so that the 40 current collecting tabs 31 of the positive electrodes extended from the laminate and overlapped with each other, and the 40 current collecting tabs 32 of the negative electrodes extended from the laminate and overlapped with each other.

The coating length and width of an active material-containing slurry in each of the positive electrode and negative electrode which were used for producing the electrode group 3, and the length and width of the separator are shown in the following Table 1.

TABLE 1

| | Length of Applied Active material-containing Slurry | Width of Applied Active material-containing Slurry |
| --- | --- | --- |
| Positive Electrode | 100 cm | 5 cm |
| Negative Electrode | 110 cm | 6 cm |
| | Length | Width |
| Separator | 200 cm | 7 cm |

As described above, the electrode group 3 was produced, which had the 40 current collecting tabs 31 of the positive electrodes and the 40 current collecting tabs 32 of the negative electrodes extending from one edge face of the electrode group 3.

2. Connection Between Electrode Group 3 and Intermediate Lead 4

Next, the electrode group 3 and the intermediate lead 4 were connected to each other as follows.

First, the two aluminum intermediate leads 4 were provided.

Each of the two intermediate leads 4 included an electrode-group-joint part 4a, two first lead-joint parts 4b, and two leg parts 4c. Each of the electrode-group-joint part 4a, the two first lead-joint parts 4b, and the two leg parts 4c of each of the two intermediate leads 4 had a principal surface having a rectangle shape. The lengths of the long sides and short sides of the principal surfaces of the electrode-group-joint parts 4a, the two first lead-joint parts 4b, and the two leg parts 4c of each of the two intermediate leads 4 are shown below.

Electrode-group-joint part 4a: long side W: 20 mm; short side: 5 mm;

Two first Lead-joint parts 4b: long side: 5 mm; short side: 3 mm;

Two Leg parts 4c: long side: 5 mm; short side: 3 mm.

In Example 1, the length W of the long side of the principal surface of the electrode-group-joint part 4a was considered as the width of the electrode-group-joint part 4a.

One of the leg parts 4c connected the electrode-group-joint part 4a and one of the first lead-joint parts 4b to each other so that these were located on planes different from each other. The other leg part 4c connected the electrode-group-joint part 4a and the other first lead-joint part 4b to each other so that these were located on planes different from each other. The principal surfaces of the two leg parts 4c were opposed to each other. Furthermore, the principal surfaces of the first lead-joint parts 4b were not opposed to the principal surface of the electrode-group-joint part 4a. The short sides of the two leg parts 4c extended in a direction crossing both a plane on which the principal surface of the electrode-group-joint part 4a was located and a plane on which the principal surfaces of the two first lead-joint parts 4b were located.

On the other hand, an aluminum backup lead 6 of the positive electrode and an aluminum backup lead 7 of the negative electrode were provided.

The backup lead 6 of the positive electrode included a first sandwiching part 6a having a rectangular shape, a second sandwiching part 6b having a rectangular shape, and a connection part 6c having a rectangular shape. The connection part 6c had a rectangular principal surface having a pair of long sides. The first sandwiching part 6a and the second sandwiching part 6b extended from two end parts along the long side of the principal surface of the connection part 6c in the same direction in a direction perpendicular to the principal surface.

Similarly, the backup lead 7 of the negative electrode included a first sandwiching part 7a having a rectangular shape, a second sandwiching part 7b having a rectangular shape, and a connection part 7c having a rectangular shape. The connection part 7c had a principal surface having a pair of long sides. The first sandwiching part 7a and the second sandwiching part 7b extended from two end parts along the long side of the principal surface of the connection part 7c in the same direction in a direction perpendicular to the principal surface.

Next, the plurality of positive electrode current collecting tabs 31 extending from the electrode group 3 were sandwiched between the first sandwiching part 6a and second sandwiching part 6b of the positive electrode backup lead 6. Next, the first sandwiching part 6a and second sandwiching part 6b of the positive electrode backup lead 6, the positive electrode current collecting tabs 31 sandwiched therebetween, and the electrode-group-joint part 4a of one of the intermediate leads 4 were subjected to ultrasonic joining. In this case, a direction in which the positive electrode current collecting tabs 31 extended from the electrode group 3 was made perpendicular to the direction of the long side of the principal surface of the electrode-group-joint part 4a of the intermediate lead 4. The ratio of the width of a portion of the electrode-group-joint part 4a which is ultrasonically-joined to the positive electrode current collecting tabs 31 in the direction of the width W of the electrode-group-joint part 4a with respect to the width W was 80%.

Similarly, the plurality of negative electrode current collecting tabs 32 extending from the electrode group 3 were sandwiched between the first sandwiching part 7a and second sandwiching part 7b of the negative electrode backup lead 7. Next, the first sandwiching part 7a and second sandwiching part 7b of the negative electrode backup lead 7, the negative electrode current collecting tabs 32 sandwiched therebetween, and the electrode-group-joint part 4a of the other intermediate lead 4 were subjected to ultrasonic joining. In this case, a direction in which the negative electrode current collecting tabs 32 extended from the electrode group 3 was made perpendicular to the direction of the long side of the principal surface of the electrode-group-joint part 4a of the intermediate lead 4. The ratio of the width of a portion of the electrode-group-joint part 4a which is ultrasonically-joined to the negative electrode current collecting tabs 32 in the direction of the width W of the electrode-group-joint part 4a with respect to the width W was 80%.

Ultrasonic joining was performed so that portions which had a width of 2 mm and were not subjected to ultrasonic joining were respectively left in both the end parts in the direction of the width W of the electrode-group-joint part 4a of the intermediate lead 4.

3. Connection Between Lid 2 and Terminal Lead 5

On the other hand, a lid 2 and a terminal lead 5 were connected to each other as follows.

First, a sealing plate 21 was provided. The sealing plate 21 was provided with a gas-relief vent 22. The gas-relief vent 22 included a groove 23 formed in the bottom surface of a rectangular recessed part formed in the sealing plate 21. The gas-relief vent 22 was designed to be ruptured when a pressure of 1 MPa was applied to the groove 23.

Besides the gas-relief vent 22, two recessed parts 24 were formed in the sealing plate 21. Through hole 25 was formed in the bottom part of each of the recessed parts 24.

Furthermore, the sealing plate 21 included a liquid injection port 21a. The liquid injection port 21a was an inlet of a liquid injection passage passing through the lid 2.

On the other hand, two terminal leads 5 of aluminum were provided. Each of the two terminal leads 5 included a lid-joint part 5a and a second lead-joint part 5b.

The lid-joint part 5a had a principal surface having a rectangular shape. The second lead-joint part 5b extended from an end part along one long side of the principal surface of the lid-joint part 5a in a direction perpendicular to the principal surface of the lid-joint part 5a. Each of the lid-joint parts 5a of the terminal leads 5 had a through hole 5c. The lid-joint part 5a of one of the terminal leads 5 further had a through hole 5d.

Furthermore, two external insulating materials 28, two internal insulating materials 29, a positive electrode terminal 26, and a negative electrode terminal 27 were provided. The two external insulating materials 28, the two internal insulating materials 29, the positive electrode terminal 26, and the negative electrode terminal 27 had the same structure as that described above with reference to FIG. 1.

The sealing plate 21, the two terminal leads 5, the two external insulating materials 28, the two internal insulating materials 29, the positive electrode terminal 26, and the negative electrode terminal 27 which were provided were assembled as described above with reference to FIG. 1. Thus, the lid 2 and the two terminal leads 5 were connected to each other.

4. Connection Between Intermediate Lead 4 and Terminal Lead 5

Next, the first lead-joint part 4b of the intermediate lead 4 was laser-welded to the second lead-joint part 5b of the terminal lead 5, to connect the intermediate lead 4 and the terminal lead 5 to each other. A distance l between a principal surface of the electrode-group-joint part 4a of the intermediate lead 4 opposed to the terminal lead 5 and a principal surface of the second lead-joint part 5b of the terminal lead 5 opposed to the intermediate lead 4 was 1 mm. The ratio of the distance l between the principal surface of the electrode-group-joint part 4a of the intermediate lead 4 opposed to the terminal lead 5 and the principal surface of the second lead-joint part 5b of the terminal lead 5 opposed to the intermediate lead 4 with respect to the width W of the electrode-group-joint part 4a of the intermediate lead 4 was 0.05.

Thus, a unit including the lid 2, the terminal lead 5, the intermediate lead 4, and the electrode group 3 was assembled.

5. Housing of Unit

The unit was housed in a container 1 having an opening. Then, the peripheral part of the opening of the container 1 and the peripheral part of the lid 2 were welded to each other. Thus, the electrode group 3 was housed in the container 1.

6. Injection

After the electrode group 3 was housed, a nonaqueous electrolytic solution was injected in the container 1 through a liquid injection port passing through the sealing plate 21, one of the internal insulating materials 29, and the lid-joint part 5a of one of the terminal leads 5. As the nonaqueous electrolytic solution, one obtained by dissolving $LiPF_6$ as an electrolyte at a concentration of 1.5 mol/L in a nonaqueous solvent obtained by mixing PC and MEC at a volume ratio of 1:2 was used.

7. Sealing

After the nonaqueous electrolytic solution was injected, the liquid injection port 21a was sealed by a sealing lid to complete the assembly of the battery 10.

8. Initial Charge

The battery 10 assembled as described above was subjected to a constant-current constant-voltage (CCCV) charge by 0.1 A and 2.7 V as an initial charge for 10 hours.

Examples 2 to 9

The battery 10 was assembled in the same manner as in Example 1 except that the width W of the electrode-group-joint part 4a of the intermediate lead 4 was changed as shown in Table 2 without changing the width of the ultrasonically-joined portion of the electrode-group-joint part of the intermediate lead 4, and the distance l between the electrode-group-joint part 4a of the intermediate lead 4 and the second lead-joint part 5b of the terminal lead 5 was changed as shown in Table 2. Then, the assembled battery 10 was subjected to an initial charge according to the same method as that of Example 1.

Comparative Example 1

A battery was assembled in the same manner as in Example 1 except that two flat aluminum plates were used in place of the intermediate lead 4.

Herein, first, a part of one of the two flat aluminum plates, a positive electrode backup lead 6, and a positive electrode current collecting tab 31 were subjected to ultrasonic joining. Then, a portion of the aluminum plate which was not ultrasonically joined was laser welded to a second lead-joint part 5b of one of terminal leads 5. Similarly, a part of the other flat aluminum plate, a negative electrode backup lead 7, and a negative electrode current collecting tab 32 were subjected to ultrasonic joining. Then, a portion of the aluminum plate which was not ultrasonically joined was laser welded to the second lead-joint part 5b of the terminal lead 5.

The assembled battery was subjected to an initial charge according to the same method as that of Example 1.

Comparative Example 2

A battery was assembled in the same manner as in Example 1 except that two terminal leads 5 were respectively ultrasonically joined to a positive electrode backup lead 6 and a positive electrode current collecting tab 31, and a negative electrode backup lead 7 and a negative electrode current collecting tab 32 without using an intermediate lead 4.

However, in this method, a gas-relief vent 22, a positive electrode terminal 26, and a negative electrode terminal 27 were damaged. Therefore, a battery could not be produced in Comparative Example 2.

(Evaluation)

The following evaluations were performed for the batteries of Examples 1 to 9 and Comparative Example 1 subjected to the initial charge as described above.

<Capacity Measurement>

The batteries subjected to the initial charge were discharged to 1.5 V at 1.0 A, to measure discharge capacities.

<Measurement of Volume Energy Densities>

The volume of each of the measured batteries was 50 cc. Volume energy densities were calculated from the volumes.

pressurized in an atmosphere of 25° C. by using a pressurization pump. Pressures when the groove 23 of the gas-relief vent 22 was ruptured were recorded, and the average and the standard deviation of the pressures for the each 100 batteries were obtained.

<Measurement of Resistance Values>

The batteries subjected to capacity measurement were recharged, and adjusted to 50% of SOC (charge state). The batteries were measured for internal resistance (AC-IMP) at 1 kHz.

(Results)

The results of the evaluations performed for the batteries of Examples 1 to 9 and Comparative Example 1 and the reference test batteries are summarized in the following Table 2.

TABLE 2

| | Width W [mm] of Electrode-Group-Joint part 4a of Intermediate Lead 4 | Width [mm] of Portions left no-ultarasonic-joined on both end parts in direction of Width W of Electrode-Group-Joint part 4a of Intermediate Lead 4 | Ratio [%] of Width of Portion of Electrode-Group-Joint Part 4a ultrasonically-joined to Electrode Current Collecting Tab 31 or 32 with respect to Width W of Electrode-Group-Joint Part 4a |
|---|---|---|---|
| Example 1 | 20 | 2 | 80 |
| Example 2 | 20 | 2 | 80 |
| Example 3 | 20 | 2 | 80 |
| Example 4 | 18 | 1 | 94.4 |
| Example 5 | 216 | 100 | 7.4 |
| Example 6 | 17 | 0.5 | 94.1 |
| Example 7 | 316 | 150 | 5.1 |
| Example 8 | 20 | 2 | 80 |
| Example 9 | 20 | 2 | 80 |
| Comparative Example 1 | (Intermediate Lead having a plate shape) | — | — |
| Comparative Example 2 | (No Intermediate Lead) | — | — |

| | Distance 1 [mm] between Electrode-group-Joint Part 4a of Intermediate Lead 4 and Second Lead-Joint Part 5b of Terminal lead 5 | l/w | Volume Energy Density [Wh/l] | Valve Opening Pressure [MPa] of Gas-relief Vent 22 | | Internal Resistance (AC-IMP) [mΩ] |
|---|---|---|---|---|---|---|
| | | | | Average | Standard Deviation σ | |
| Example 1 | 1 | 0.05 | 24 | 1.0 | 0.03 | 5.0 |
| Example 2 | 0.1 | 0.005 | 24 | 1.0 | 0.03 | 5.5 |
| Example 3 | 50 | 2.5 | 22 | 1.0 | 0.03 | 5.5 |
| Example 4 | 1 | 0.056 | 24 | 1.0 | 0.03 | 6.0 |
| Example 5 | 1 | 0.005 | 22 | 1.0 | 0.03 | 6.5 |
| Example 6 | 1 | 0.059 | 24 | 1.0 | 0.03 | 8.0 |
| Example 7 | 1 | 0.003 | 10 | 1.0 | 0.03 | 9.0 |
| Example 8 | 0.05 | 0.003 | 24 | 1.0 | 0.03 | 14.0 |
| Example 9 | 100 | 5 | 10 | 1.0 | 0.03 | 15.0 |
| Comparative Example 1 | 0 (Flat aluminum plate is used) | — | 24 | 1.0 | 0.03 | 30.0 |
| Comparative Example 2 | — | — | Battery cannot be produced | 0.8 | 0.1 | Battery cannot be produced |

<Measurement of Gas-Relief Vent Opening>

One hundred batteries were separately produced as batteries for the gas-relief vent test, for each of the batteries of Examples 1 to 9 and Comparative Example 1. However, an electrolytic solution was not injected into the batteries.

One hundred reference test batteries were produced by using the method described in Comparative Example 2.

Water was added into each of the batteries for the gas-relief vent test and the reference test batteries via the liquid injection port 21a. Then, the insides of the batteries for the gas-relief vent test into which the water was added were Table 2 showed that the gas-relief vent 22 ruptured at an average of 1 MPa in each of the batteries 10 of Examples 1 to 9, which provided functions as designed. That is, although the batteries of Examples 1 to 9 were produced by using ultrasonic joining, the batteries could include the reliable gas-relief vent 22. This is because the connection between the terminal lead 5 and the intermediate lead 4 which are integrated with the lid 2 can be performed independently of the connection between the intermediate lead 4 and the electrode group 3 by ultrasonic joining.

On the other hand, the reference test batteries described in the method described in Comparative Example 2 ruptured at an average of 0.8 MPa, i.e., a pressure lower than a design pressure. This is considered to be because in the method described in Comparative Example 2, the intermediate lead 4 was not used, and ultrasonic vibration was transmitted to the lid 2 during ultrasonic joining, and caused a problem in the gas-relief vent 22.

Furthermore, the batteries 10 of Examples 1 to 9 had an internal resistance lower than that of the battery of Comparative Example 1.

In the batteries 10 of examples 1 to 9, the electrode-group-joint part 4a of the intermediate lead 4 and the first lead-joint part 4b were separated by the two leg parts 4c. Therefore, even if a stress was generated in the intermediate lead 4 in each of these batteries 10 when the electrode-group-joint part 4a was subjected to ultrasonic joining, the stress was reduced by the deformation of the electrode-group-joint part 4a and two leg parts 4c. Thereby, the deformation of the first lead-joint part 4b could be suppressed. As a result, in each of the batteries 10 of Examples 1 to 9, the laser welding between the first lead-joint part 4b of the intermediate lead 4 and the second lead-joint part 5b of the terminal lead 5 could be firmly performed. Thus, since the joining between the intermediate lead 4 and the terminal lead 5 was firmly performed, the batteries 10 of Examples 1 to 9 could exhibit a low resistance value.

Another reason why the batteries 10 of Examples 1 to 9 can exhibit a low internal resistance is as follows. The joining among the electrode-group-joint part 4a of the intermediate lead 4, the positive electrode backup lead 6, and the positive electrode current collecting tab 31, and the joining among the electrode-group-joint part 4a of the intermediate lead 4, the negative electrode backup lead 7, and the negative electrode current collecting tab 32 can be firmly performed by ultrasonic joining suitable for simultaneously joining a plurality of metals.

On the other hand, in the flat aluminum plate of Comparative Example 1, the portion subjected to ultrasonic joining and the portion to which the second lead-joint part 5b of the terminal lead 5 was joined were on the same plane. Thereby, in the battery of Comparative Example 1, the portion of the aluminum plate which was connected to the second lead-joint part 5b of the terminal lead 5 was deformed under the influence of ultrasonic joining, which caused the non-flatness of the portion to which the second lead-joint part 5b of the terminal lead 5 was to be joined. Because of that, it is considered that the battery of Comparative Example 1 could not exhibit low internal resistance since laser welding between the deformed portion of the aluminum plate and the second lead-joint part 5b of the terminal lead 5 could not be firmly performed.

Examples 1 to 6 and 8 had a volume energy density higher than that of Example 7. The width of the portion, which was not ultrasonically joined, of the electrode-group-joint part 4a of the intermediate lead 4 in Examples 1 to 6 and 8 was smaller than that of Example 7. Since the area, which was ultrasonically joined, of the electrode-group-joint part 4a was not changed, the intermediate lead 4 used in each of Examples 1 to 6 and 8 was smaller than that used in Example 7. That is, in each of the batteries 10 of Examples 1 to 6 and 8, the volume of the intermediate lead 4 as a non-electric generation element with respect to the battery volume was small. Because of this, Examples 1 to 6 and 8 had a volume energy density higher than that of Example 7.

Examples 1 to 7 had an internal resistance lower than that of Examples 8. This is because in each of Examples 1 to 7, the distance between the electrode-group-joint part 4a and the first lead-joint part 4b in the intermediate lead 4 is more than that of Examples 8, and as a result, the deformation of the first lead-joint part 4b under the influence of ultrasonic joining can be suppressed as compared with that of Examples 8.

Examples 1 to 6 had an internal resistance lower than that of Example 7. In the batteries 10 of Examples 1 to 6, the ratio of the distance l between the principal surface of the electrode-group-joint part 4a of the intermediate lead 4 opposed to the terminal lead 5 and the principal surface of the second lead joint part 5b of the terminal lead 5 opposed to the intermediate lead 4 with respect to the width W of the electrode group joint part 4a was within a range of 0.005 to 2.5. In each of the batteries 10 of Examples 1 to 6, the stress generated in the intermediate lead 4 by ultrasonic joining was more reduced as compared with that of the battery 10 of Example 7 in which the ratio l/W was 0.003 which deviated from the above range. Therefore, in each of the batteries of Example 1 to 6, the deformation of the first lead-joint part 4b of the intermediate lead 4 could be suppressed. Therefore, in each of the batteries 10 of Examples 1 to 6, the laser welding between the first lead-joint part 4b of the intermediate lead 4 and the second lead-joint part 5b of the terminal lead 5 was easier and firmer than that of the battery 10 of Example 7. As a result, the batteries 10 of Examples 1 to 6 could have an internal resistance lower than that of the battery 10 of Example 7.

Furthermore, Examples 1 to 5 had an internal resistance lower than that of Example 6. This is because the width of the portion, which is not ultrasonically joined, of the electrode-group-joint part 4a of the intermediate lead 4 in Examples 1 to 4 is more than that of Example 6, and the deformation of the first lead joint part 4b of the intermediate lead by ultrasonic joining could be suppressed as compared with that of Example 6.

Examples 1 to 6 had a volume energy density higher than that of Example 9. This is because the distance between the electrode-group-joint part 4a and the first lead-joint part 4b in the intermediate leads 4 used in Examples 1 to 6 is smaller than that of Example 9. That is, in Examples 1 to 6, since the two leg parts 4c are smaller than that of Example 9, the volume of the intermediate lead 4 as a non-electric generation element in the battery volume was smaller than that of the intermediate lead 4 of Example 9. Furthermore, Examples 1 to 6 had an internal resistance lower than that of Example 9. This is because the ratio l/W in Examples 1 to 6 is smaller than that of Example 9, and in Examples 1 to 6, the stress generated in the intermediate lead by the ultrasonic wave could be further reduce, and as a result, the deformation of the first lead-joint part can be further prevented.

That is, the battery according to at least one embodiment and examples described above include the intermediate lead in which the leg part connects the first lead-joint part and the electrode-group-joint part to each other so that these are located on planes different from each other. Therefore, the joining between the second lead-joint part of the terminal lead and the first lead-joint part of the intermediate lead, and the joining between the electrode-group-joint part of the intermediate lead and the plurality of current collecting tabs can be firmly performed independently of each other. Therefore, the battery according to at least one embodiment and examples described above can include a reliable gas-relief vent, and can exhibit a low resistance value.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
a container having an opening;
a lid provided on the opening of the container;
a gas-relief vent provided in the lid;
an electrode group housed in the container, comprising an edge face opposed to the lid, and comprising a plurality of current collecting tabs extending from the edge face;
an intermediate lead comprising a first lead-joint part comprising a plate, an electrode-group-joint part to which the plurality of current collecting tabs are electrically connected, and a leg part comprising a plate connecting the first lead-joint part and the electrode-group-joint part to each other, and the first lead joint part and the electrode-group-joint part being located on planes different from each other, and the plate of the leg part and the plate of the first lead-joint part being parallel to a direction in which the plurality of current collecting tabs extend from the edge face of the electrode group; and
a terminal lead comprising a lid-joint part connected to the lid, and a second lead-joint part extending from the lid-joint part, being opposed to the first lead-joint part and electrically connected to the first lead-joint part.

2. The battery according to claim 1, wherein
the electrode-group-joint part of the intermediate lead and the plurality of current collecting tabs of the electrode group are connected by ultrasonic joining, and the first lead-joint part of the intermediate lead and the second lead-joint part of the terminal lead are connected to each other by laser welding or resistance welding.

3. The battery according to claim 2, wherein
a portion of the electrode-group-joint part of the intermediate lead is subjected to ultrasonic joining, the portion having a width corresponding to 5% to 95% of a width W of the electrode-group-joint part; and
a following relation is satisfied:

$$0.005 \leq l/W \leq 5$$

wherein the l is a distance between the electrode-group-joint part of the intermediate lead and the second lead-joint part of the terminal lead.

4. The battery according to claim 3, wherein
the distance l is within a range of 0.1 mm to 50 mm.

5. The battery according to claim 1, wherein
the terminal lead comprises an aluminum material or an aluminum alloy material;
the intermediate lead comprises an aluminum material or an aluminum alloy material; and
the plurality of current collecting tabs comprise an aluminum material or an aluminum alloy material.

6. The battery according to claim 1, further comprising a tab-sandwiching lead comprising a first sandwiching part and a second sandwiching part, the first sandwiching part and the second sandwiching part sandwiching the plurality of current collecting tabs therebetween, the tab-sandwiching lead being joined to the electrode-group-joint part of the intermediate lead.

7. The battery according to claim 6, wherein the electrode-group-joint part of the intermediate lead is ultrasonically joined to the first sandwiching part or the second sandwiching part of the tab-sandwiching lead.

* * * * *